United States Patent
Kubo et al.

(10) Patent No.: US 10,377,903 B2
(45) Date of Patent: Aug. 13, 2019

(54) NANOPARTICLE-CONTAINING SOLUTION AND USE THEREOF

(71) Applicant: SEKISUI PLASTICS CO., LTD., Osaka (JP)

(72) Inventors: Junko Kubo, Nara (JP); Takashi Motomura, Nara (JP); Shuichi Sasahara, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/126,799

(22) PCT Filed: Jun. 23, 2015

(86) PCT No.: PCT/JP2015/068044
§ 371 (c)(1),
(2) Date: Sep. 16, 2016

(87) PCT Pub. No.: WO2016/002587
PCT Pub. Date: Jan. 7, 2016

(65) Prior Publication Data
US 2017/0101538 A1 Apr. 13, 2017

(30) Foreign Application Priority Data

Jun. 30, 2014 (JP) ................. 2014-135033
Sep. 30, 2014 (JP) ................. 2014-201827
Mar. 10, 2015 (JP) ................. 2015-047466

(51) Int. Cl.
| | | |
|---|---|---|
| C09C 3/08 | (2006.01) | |
| C09C 1/00 | (2006.01) | |
| C09D 7/40 | (2018.01) | |
| B82Y 20/00 | (2011.01) | |
| B82Y 30/00 | (2011.01) | |
| B82Y 40/00 | (2011.01) | |
| C09C 3/10 | (2006.01) | |
| C09D 17/00 | (2006.01) | |
| C09D 201/00 | (2006.01) | |
| G02B 5/02 | (2006.01) | |
| C09D 125/06 | (2006.01) | |
| C09D 133/08 | (2006.01) | |
| C09D 133/12 | (2006.01) | |

(52) U.S. Cl.
CPC ........... *C09C 1/0021* (2013.01); *B82Y 20/00* (2013.01); *B82Y 30/00* (2013.01); *B82Y 40/00* (2013.01); *C09C 1/00* (2013.01); *C09C 3/08* (2013.01); *C09C 3/10* (2013.01); *C09D 7/40* (2018.01); *C09D 7/67* (2018.01); *C09D 17/00* (2013.01); *C09D 17/007* (2013.01); *C09D 125/06* (2013.01); *C09D 133/08* (2013.01); *C09D 133/12* (2013.01); *C09D 201/00* (2013.01); *G02B 5/02* (2013.01); *G02B 5/0268* (2013.01); *C01P 2004/64* (2013.01); *C01P 2006/60* (2013.01)

(58) Field of Classification Search
USPC ........................... 252/500; 430/619; 264/1.1
See application file for complete search history.

(56) References Cited

U.S. PATENT DOCUMENTS

| | | | | |
|---|---|---|---|---|
| 2001/0029001 A1* | 10/2001 | Lelental | ................ | G03C 1/498 430/619 |
| 2005/0163971 A1 | 7/2005 | Kobayashi et al. | | |
| 2010/0225013 A1* | 9/2010 | Eiha | ...................... | B29C 43/021 264/1.1 |
| 2012/0216713 A1 | 8/2012 | Cheema et al. | | |

FOREIGN PATENT DOCUMENTS

| | | |
|---|---|---|
| CN | 101506291 A | 8/2009 |
| EP | 0 949 304 | 10/1999 |
| JP | 60-212436 | 10/1985 |
| JP | 08-110401 | 4/1996 |
| JP | 09-194756 | 7/1997 |
| JP | 11-349850 | 12/1999 |
| JP | 2004-354568 | 12/2004 |
| JP | 2005-314648 | 11/2005 |
| JP | 2007291162 A | 11/2007 |
| JP | WO2008026778 * | 3/2008 |
| JP | 2008-179514 | 8/2008 |
| JP | 2008-201634 | 9/2008 |
| JP | 2009-24068 | 2/2009 |
| JP | 2009-155622 | 7/2009 |
| JP | 2010-95679 | 4/2010 |
| JP | 2010-155937 | 7/2010 |
| JP | 2010-159464 | 7/2010 |
| JP | 2013-502709 | 1/2013 |
| JP | 2013-216858 | 10/2013 |
| WO | 2008014573 A1 | 2/2008 |
| WO | 2008/026778 A1 | 3/2008 |
| WO | 2008/102724 A1 | 8/2008 |
| WO | 2015/111664 | 7/2015 |

OTHER PUBLICATIONS

International Search Report issued in PCT/JP2015/068044, dated Sep. 29, 2015, along with an English language translation.

* cited by examiner

*Primary Examiner* — Monique R Peets
(74) *Attorney, Agent, or Firm* — Greenblum & Bernstein, P.L.C.

(57) ABSTRACT

A nanoparticle-containing solution comprising nanoparticles of a metal oxide, and a solution obtained by dissolving, in an organic solvent, a phosphoric acid ester and a reactive group-containing carbonyl compound as hydrophobic treatment agents, the phosphoric acid ester having an alkylene oxide chain, and an alkyl group or allyl group at an end, and the reactive group-containing carbonyl compound having at least a vinyl group and a carboxyl group or cyclic ester group, and having a solubility parameter calculated by Fedors' method of 10.0 to 12.5.

8 Claims, 3 Drawing Sheets

NANOPARTICLE-CONTAINING SOLUTION AND USE THEREOF

TECHNICAL FIELD

The present invention relates to a nanoparticle-containing solution and use thereof. More particularly, the present invention relates to a nanoparticle-containing solution of a hydrophobized metal oxide which is useful in manufacturing optical parts such as light diffusing films, a nanoparticle-containing dried body obtained from a nanoparticle-containing solution, a polymerizable nanoparticle-containing material, a nanoparticle-containing resin, nanoparticle-containing resin particles, a coating material, a light diffusing film, a molded article, and a gel.

BACKGROUND TECHNOLOGY

In recent years, research of optical materials is intensively made, and particularly, in the field of lens materials, development of materials excellent in a high refractive index, low dispersibility (i.e. high Abbe number), heat resistance, transparency, easy moldability, lightness, moisture resistance, chemical resistance, solvent resistance, and the like is strongly demanded. Plastics (resins) are light and hardly cracked and can be easily processed into a variety of shapes, as compared with inorganic materials such as glasses. From a view point of easy processing, the plastics have been rapidly spread in not only spectacle lenses and lenses for cameras, but also in recent years, particular-shaped optical materials such as display panel utility. On the other hand, since the resins have generally a low refractive index as compared with glasses, a higher refractive index of materials themselves is demanded in order to thin optical members.

Therefore, in the field of display panels, provision of a metal oxide particle-complexed resin which has a high refractive index and is excellent in transparency by containing particles of a metal oxide such as titanium oxide and zirconium oxide in the resin has been proposed. For example, since zirconium oxide has a high refractive index peculiar to a metal oxide, by complexing with the resin, application to high refractive index optical materials is expected.

In order to manufacture a metal oxide particle-complexed resin which has a high refractive index and is excellent in transparency, it is necessary to sufficiently reduce a size of metal oxide particles in a complexed resin as compared with a wavelength of visible light, in order to prevent light scattering due to the metal oxide particles in the complexed resin. Specifically, by complexing nanoparticles of a metal oxide having a particle diameter of 100 nm or less with a resin while retaining the particle diameter, it is expected that a refractive index of optical materials can be improved while maintaining transparency.

On the other hand, it has been known that nanoparticles of a metal oxide have hydrophilicity. Therefore, in order to cause such hydrophilic nanoparticles to be uniformly contained in a hydrophobic solvent or a hydrophobic resin without aggregating the nanoparticles, treatment of hydrophobizing a surface thereof to enhance affinity with an organic solvent or a resin becomes necessary.

Hydrophobization of a surface of nanoparticles of a metal oxide is performed by a variety of methods.

For example, Japanese Unexamined Patent Application, First Publication No. 2010-159464 (Patent Document 1) describes nanoparticles which were hydrophobized by covering a surface with a phosphoric acid-based surfactant having a specified structure.

Also, Japanese Unexamined Patent Application, First Publication No. 2008-201634 (Patent Document 2) describes a zirconium oxide particle-containing material (dispersion) having light transmittance in terms of the thickness of 10 mm at a wavelength of 589 nm of 80% or more, which contains zirconium oxide particles having a number average particle diameter of 1 to 15 nm, a dispersant and a dispersing medium (organic solvent). It is stated that in this containing material, a refractive index of a composition of the zirconium oxide particles and the dispersant other than the dispersing medium is 1.80 or more.

Furthermore, Japanese Unexamined Patent Application, First Publication No. 2009-024068 (Patent Document 3) describes a process for manufacturing resin particles comprising nanoparticles of zirconium oxide obtained by containing (dispersing) liquid droplets comprising nanoparticles of covered zirconium oxide covered with two or more covering agents (comprising at least a carboxylic acid of a hydrocarbon having 6 or more carbon atoms), and a monomer in an aqueous solvent, and conducting a polymerization reaction in the liquid droplets.

Japanese Unexamined Patent Application, First Publication No. H08-110401 (Patent Document 4) describes a transparent high refractive index film consisting of an organic polymer comprising metal compound microparticles having a refractive index of 1.70 to 2.70.

PRIOR ART DOCUMENTS

Patent Documents

Patent Document 1: Japanese Unexamined Patent Application, First Publication No. 2010-159464
Patent Document 2: Japanese Unexamined Patent Application, First Publication No. 2008-201634
Patent Document 3: Japanese Unexamined Patent Application. First Publication No. 2009-024068
Patent Document 4: Japanese Unexamined Patent Application, First Publication No. H08-110401

SUMMARY OF THE INVENTION

Problem to be Solved by the Invention

In the methods described in Patent Documents 1 to 3, a material containing nanoparticles of a metal oxide excellent in dispersibility in a solvent is obtained, but when the nanoparticles are complexed with a resin, transmittance of light was not sufficient due to clouding of a complex. In the method described in Patent Document 4, a transparent high refractive index film is obtained, but when the film thickness is thickened, transmittance of light was not sufficient due to clouding of a complex. Therefore, provision of nanoparticles in which complexing into a resin does not prevent light transmittance of the resin has been desired.

Means for Solving the Problem

The inventors of the present invention studied a variety of hydrophobic treatment agents, and unexpectedly found out that, by concurrently using a phosphoric acid ester and a reactive group-containing carbonyl compound having specified structures, a surface of nanoparticles of a metal oxide can be hydrophobized, and even when complexed with a resin, nanoparticles which do not prevent light transmittance of the resin can be provided, leading to the present invention.

Thus, in accordance with the present invention, there is provided a nanoparticle-containing solution, comprising nanoparticles of a metal oxide, and a solution obtained by dissolving, in an organic solvent, a phosphoric acid ester and a reactive group-containing carbonyl compound as hydrophobic treatment agents, the phosphoric acid ester having an alkylene oxide chain, and an alkyl group or an allyl group at an end, and the reactive group-containing carbonyl compound having at least a vinyl group and a carboxyl group or a cyclic ester group, and having a solubility parameter calculated by Fedors' method of 10.0 to 12.5.

Also, in accordance with the present invention, there is provided a nanoparticle-containing dried body obtained by drying and removing the organic solvent from the nanoparticle-containing solution.

Furthermore, in accordance with the present invention, there is provided a polymerizable nanoparticle-containing material in which the nanoparticle-containing solution or the nanoparticle-containing dried body is contained in a polymerizable vinyl monomer.

Also, in accordance with the present invention, there is provided a nanoparticle-containing resin obtained by polymerizing the polymerizable nanoparticle-containing material.

Furthermore, in accordance with the present invention, there is provided a nanoparticle-containing resin particle obtained by suspension polymerizing the polymerizable nanoparticle-containing material in an aqueous medium.

Also, in accordance with the present invention, there is provided a coating material comprising the nanoparticle-containing resin particle, a binder resin, and a solvent.

Furthermore, in accordance with the present invention, there is provided a light diffusing film obtained by drying the coating material.

Also, in accordance with the present invention, there is provided a molded article comprising the nanoparticle-containing resin particles and a transparent resin.

Furthermore, in accordance with the present invention, there is provided a nanoparticle-containing polymer gel containing a solvent or a plasticizer containing the nanoparticle-containing solution or the nanoparticle-containing dried body, in a crosslinked polymer matrix.

Effects of Invention

In accordance with the present invention, since a surface of nanoparticles of a metal oxide can be hydrophobized, even when complexed with a resin, there can be provided a nanoparticle-containing solution which does not prevent transmittance of light entering a complex resin.

Also, in accordance with the present invention, by comprising the nanoparticle, there can be provided a resin film, resin particles, a light diffusing film, a molded article, and a polymer gel having high light transmittance and refractive index.

Furthermore, in accordance with the present invention, in the case of any one or an arbitrary combination of:

(1) the case where the phosphoric acid ester is a compound represented by the following general formula (I):

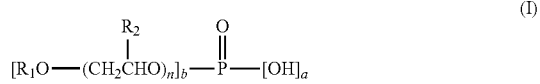

(I)

(wherein, $R_1$ is an alkyl group having 8 to 13 carbon atoms or an allyl group, $R_2$ is H or $CH_3$, n is 1 to 30, and the compound is a mixture in which a combination of a and b is a combination of 1 and 2 or 2 and 1), (2) the case where the reactive group-containing carbonyl compound is selected from a reactive group-containing carboxylic acid represented by the following general formula (II):

(II)

(wherein, $R_3$ is H or $CH_3$, and Z is a divalent hydrocarbon group of 5 or more carbon atoms optionally containing an ester group), and a reactive group-containing cyclic ester represented by the following general formula (III):

(III)

(wherein, $R_3$ is the same as that of the general formula (II), X is a divalent hydrocarbon group of 5 or more carbon atoms optionally containing an ester group, and M is a lactone or a lactide), (3) the case where the reactive group-containing carbonyl compound is selected from a reactive group-containing carboxylic acid represented by the following general formula (II)':

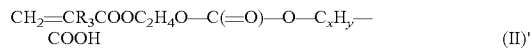

(II)'

(wherein, $R_3$ is the same as that of the general formula (II), x=2 to 6, and y=any of x-2, 2x, and 2x-2), and a reactive group-containing cyclic ester, (4) the case where the metal oxide is zirconium oxide, (5) the case where the phosphoric acid ester and the reactive group-containing carbonyl compound are contained in the nanoparticle-containing solution at the ratio of 5:95 to 70:30 (% by weight), and (6) the case where the organic solvent is selected from a lower alcohol having 1 to 4 carbon atoms, since a surface of the nanoparticles of a metal oxide can be further hydrophobized, a nanoparticle-containing solution which can be easily complexed with a resin can be provided.

Figure 1:
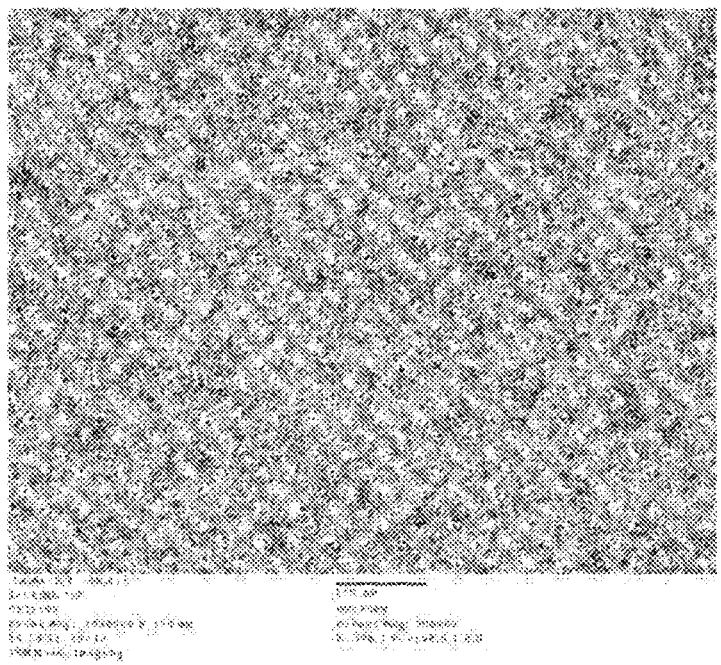
FIG. 1 is an electron microscope photograph of a cross section of a nanoparticle-containing resin of Example 1.

BEST MODE FOR CARRYING OUT THE INVENTION (Nanoparticle-Containing Solution)

A nanoparticle-containing solution comprises nanoparticles of a metal oxide, and a solution obtained by dissolving, in an organic solvent, a phosphoric acid and a reactive group-containing carbonyl compound as hydrophobic treatment agents.

(1) Nanoparticles of Metal Oxide

The metal oxide is not particularly limited, as long as hydrophobizing treatment is desired. Examples thereof include oxides of group 1, group 2, group 3, group 4, group 5, group 6, group 7, group 8, group 9, group 10, group 11, group 12, group 13, and group 14 metal elements. Specifically, examples thereof include compounds of one metal and oxygen (single metal oxides) such as zirconium oxide, titanium oxide, aluminum oxide, silicon oxide, iron oxide, silver oxide, indium oxide, zinc oxide, tin oxide, lanthanum oxide, yttrium oxide, cerium oxide, and magnesium oxide; and compounds of two or more metals and oxide (complex metal oxides) such as tin-doped indium oxide (ITO), antimony-doped tin oxide (ATO), barium titanate ($BaTiO_3$), and yttria-doped zirconium oxide. Among them, from a view point of provision of a nanoparticle-containing resin which has a high refractive index and is transparent, zirconium oxide is preferable, and from a view point of stability, stabilized zirconium oxide containing yttria is further preferable. The nanoparticles may comprise one kind of a metal oxide, or may comprise a plurality of kinds of metal oxides. A crystal structure of zirconium oxide is not particularly limited, and a tetragonal crystal, a monoclinic crystal and a cubic crystal may be contained; however, one having small change in a crystal structure is preferable.

The nanoparticles as a raw material to be contained in the nanoparticle-containing solution can have a particle diameter represented by a Z-average particle diameter of 1 to 100 nm. A Z-average particle diameter can take 1 nm, 10 nm, 20 nm, 30 nm, 40 nm, 50 nm, 60 nm, 70 nm, 80 nm, 90 nm, and 100 nm. A more preferable Z-average particle diameter is 1 to 50 nm, a further preferable Z-average particle diameter is 1 to 30 nm, and 1 to 20 nm is particularly preferable. The nanoparticles as a raw material may be powders, or nanoparticles dispersed in a dispersing medium (for example, acidic water, alkaline water, lower alcohol, and lower ketone). From a view point that a Z-average particle diameter can be more uniformized, the nanoparticles dispersed in a dispersing medium are preferable.

(2) Hydrophobic Treatment Agent

A hydrophobic treatment agent comprises a phosphoric acid ester and a reactive group-containing carbonyl compound.

(a) Phosphoric Acid Ester

A phosphoric acid ester is represented by, for example, the following general formula (I).

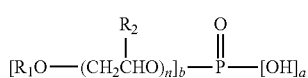

(I)

In the above formula, $R_1$ is an alkyl group having 8 to 13 carbon atoms or an allyl group ($CH_2$=$CHCH_2$—). Examples of the alkyl group having 8 to 13 carbon atoms include an octyl group, a nonyl group, a decyl group, an undecyl group, a dodecyl group, and a tridecyl group. These groups may be straight or branched. These may be used alone, or a plurality of them may be used together.

$R_2$ is H or $CH_3$.

Herein, n is the addition molar number of alkylene oxide, and is a numerical value in the range necessary for giving the addition molar number of 1 to 30, when the total is 1 mole. The addition molar number can take 1, 5, 10, 15, 20, 25, and 30.

A combination of a and b is a combination of 1 and 2 or 2 and 1.

The hydrophobic treatment agent may comprise a plurality of phosphoric acid esters satisfying the general formula (I).

An HLB value of the phosphoric acid ester in which a terminal is alkyl group is preferably 5 to 15, and further preferably 7 to 12. When the HLB value is less than 5, since an amount remaining in the particle also after suspension polymerization becomes large, and apprehension of dissolution out at the time of use is caused, this is not preferable. On the other hand, when the HLB value exceeds 15, since an amount which is transferred from oil droplets into an aqueous phase is large, aggregation occurs easily at the time of suspension polymerization, and accordingly, this is not preferable. HLB can take 5, 7, 9, 11, 13, and 15.

HUB can be obtained from HLB=7+11.7 log (Mw/Mo) (Mw: molecular weight of hydrophilic group, Mo: molecular weight of lipophilic group) as the general formula.

(b) Reactive Group-Containing Carbonyl Compound

A reactive group-containing carbonyl compound is a compound provided with at least a vinyl group, and a carboxyl group or a cyclic ester group, and represented by a solubility parameter calculated by Fedors' method being 10.0 to 12.5. The hydrophobic treatment agent may comprise a plurality of reactive group-containing carbonyl compounds.

When a solubility parameter is less than 10.0 or more than 12.5, transparency of a resin containing the nanoparticles may be reduced. A solubility parameter can take 10.0, 10.1, 10.2, 10.5, 10.8, 11.0, 11.3, 11.6, 11.9, 12.2, and 12.5. A preferable solubility parameter is 10.1 to 12.0, and a more preferable solubility parameter is 10.2 to 11.6.

Herein, the solubility parameter (SP value) is calculated based on the following estimation method of Fedors.

$$\text{SP value}(\delta) = (E_v/v)^{1/2} = (\Sigma \Delta e_i / \Sigma \Delta v_i)^{1/2} \quad \text{Fedors' Equation}$$

$E_v$: Evaporation energy
v: Molar volume
$\Delta e_i$: Evaporation energy of atom or atomic group of each component
$\Delta v_i$: Molar volume of each atom or atomic group As the evaporation energy and the molar volume of each atom or atomic group used in calculation of the above equation, values described in R. F. Fedors, Polym. Eng. Sci., 14 [2], 147-154 (1974) can be used.

A specific calculation method is described in a column of Examples.

The reactive group-containing carbonyl compound may be provided with each at least one of a vinyl group, and a carboxyl group or a cyclic ester group, and may be provided with each two or more of them. Among them, it is preferable that the compound is provided with one vinyl group and one of a carboxyl group or a cyclic ester group. A position of a vinyl group and a carboxyl group or a cyclic ester group is not particularly limited, but it is preferable that those groups are positioned at an end of the reactive group-containing carbonyl compound.

Examples of the reactive group-containing carbonyl compound include a reactive group-containing carboxylic acid and a reactive group-containing cyclic ester.

The reactive group-containing carboxylic acid may be either an aromatic carboxylic acid or an aliphatic carboxylic acid.

Examples of the aromatic carboxylic acid include vinylbenzoic acid.

It is preferable that, in the aliphatic carboxylic acid, the carbon number except for carbons constituting the vinyl group and the carboxyl group is 5 or more. When the carbon number is less than 5, transparency of a resin containing the nanoparticles may be reduced. The carbon number can take 5, 10, 15, 20, 35, 30, 35, and 40 or more.

It is preferable that the reactive group-containing carboxylic acid is a compound represented by the following general formula (II).

$$CH_2=CR_3-Z-COOH \quad (II)$$

In the above formula, $R_3$ is H or $CH_3$.

Z is a divalent hydrocarbon group of 5 or more carbon atoms optionally containing an ester group. An upper limit of the carbon number is preferably 30. Examples of the specific hydrocarbon group include polymethylene groups such as a pentamethylene group, a hexamethylene group, a heptamethylene group, and an octamethylene group, a phenylene group, and the like. Examples of the ester group include ester groups constituting an ester compound of a carboxylic acid having a vinyl group and an alcohol having a carboxyl group (the carbon number of the carboxylic acid and the alcohol is within such a range that the carbon number of Z is 5 or more). A plurality of ester groups may exist in Z.

A further preferable reactive group-containing carboxylic acid is a compound represented by the following general formula (II)'.

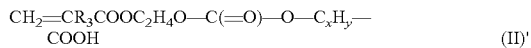

$$CH_2=CR_3COOC_2H_4O-C(=O)-O-C_xH_y-COOH \quad (II)'$$

In the above formula, $R_3$ is the same as that of the general formula (II), x is 2 to 6, and y is any of x−2, 2x, and 2x−2. x can take 2, 3, 4, 5, and 6.

The reactive group-containing cyclic ester is preferably a compound represented by the following general formula (III).

$$CH_2=CR_3-X-M \quad (III)$$

In the above formula, $R_3$ is the same as that of the general formula (II).

X is a divalent hydrocarbon group of 1 or more carbon atoms optionally containing an ester group. An upper limit of the carbon number is preferably 20. Examples of a specific hydrocarbon group include polymethylene groups such as a methylene group, an ethylene group, a trim ethylene group, a tetramethylene group, a pentamethylene group, a hexamethylene group, a heptamethylene group, an octamethylene group, and the like. Examples of the ester group include ester groups constituting an ester compound of a carboxylic acid having a vinyl group, and an alcohol having a cyclic ester group. A plurality of ester groups may exist in Z. M is a lactone or a lactide.

Examples of a further preferable reactive group-containing cyclic ester include γ-butyrolactone acrylate and γ-butyrolactone methacrylate.

(c) Content Ratio of Phosphoric Acid Ester and Reactive Group-Containing Carbonyl Compound It is preferable that the phosphoric acid and the reactive group-containing carbonyl compound are contained in the nanoparticle-containing solution at the ratio of 5:95 to 70:30 (% by weight). When the ratio of the reactive group-containing carbonyl compound is less than 30% by weight, transparency of a polymer containing the nanoparticles may be reduced. When the ratio is more than 95% by weight, transparency of a polymer containing the nanoparticles and dispersibility in the polymerizable vinyl monomer may be reduced. The ratio of the reactive group-containing carbonyl compound can take 30% by weight, 40% by weight, 50% by weight, 60% by weight, 70% by weight, 80% by weight, 90% by weight, and 95% by weight. The preferable ratio of the reactive group-containing carbonyl compound is 40 to 90% by weight, and the more preferable ratio of the reactive group-containing carbonyl compound is 50 to 90% by weight.

(3) Organic Solvent

An organic solvent is not particularly limited as long as it can dissolve the hydrophobic treatment agent. Examples thereof include lower alcohols having 1 to 4 carbon atoms such as methanol, ethanol, propanol, and butanol, lower ketones such as methyl ethyl ketone, methyl isobutyl ketone, and the like. In the organic solvent, water may exist at such a range that solubility of the hydrophobic treatment agent is not prevented. Soluble means that 1 g or more of the hydrophobic treatment agent can be dissolved in 100 g of the organic solvent at a normal temperature (about 25° C.).

(4) Solution of Hydrophobic Treatment Agent

The content ratio of the hydrophobic treatment agent to be contained in the solution is not particularly limited, as long as the nanoparticles of a metal oxide can be hydrophobized. The content ratio is preferably 10 to 50% by weight relative to the nanoparticles of a metal oxide. When the content ratio is less than 10% by weight, transparency of a polymer containing the nanoparticles and dispersibility in the polymerizable vinyl monomer may be reduced. When the content ratio is more than 50% by weight, the remarkable effect commensurate with the increase may not be observed. The content ratio can take 10% by weight, 15% by weight, 20% by weight, 25% by weight, 30% by weight, 35% by weight, 40% by weight, 45% by weight, and 50% by weight. The more preferable content ratio is 15 to 45% by weight, and the further preferable content ratio is 20 to 40% by weight.

(5) Other Components

Other components such as aliphatic phosphoric acid, sulfonic acid, carboxylic acid, and amine having less than 4 carbon atoms may be contained, in such a range that the characteristics of the nanoparticle-containing solution of the present invention are not deteriorated.

(6) Process for Manufacturing Nanoparticle-Containing Solution

A process for manufacturing a nanoparticle-containing solution is not particularly limited, and a method of adding nanoparticles and a hydrophobic treatment agent to an organic solvent, a method of dispersing nanoparticles in an organic solvent in advance, and adding a hydrophobic treatment agent, and the like can be mentioned.

(Nanoparticle-Containing Dried Body)

A nanoparticle-containing dried body is obtained by drying and removing an organic solvent from the nanoparticle-containing solution. A method of removing the organic solvent is not particularly limited. Examples thereof include a method of obtaining a dried body by drying the containing solution as it is, and a method of obtaining a dried body by adding water to the containing solution, then, precipitating the nanoparticles in the containing solution using a centrifuge, and drying the precipitate.

(Polymerizable Nanoparticle-Containing Material, Nanoparticle-Containing Resin, and Nanoparticle-Containing Resin Particles)

(1) Polymerizable Nanoparticle-Containing Material

A polymerizable nanoparticle-containing material (dispersion) is such that the nanoparticle-containing solution or the nanoparticle-containing dried body is contained (dispersed) in a polymerizable vinyl monomer. It is preferable that the nanoparticles in the containing material have a particle diameter (diameter of dispersed particles) of 1 to 100 nm. When a particle diameter is less than 1 nm, crystallinity becomes deficient, and it may become difficult to manifest properties as a metal oxide such as a high refractive index. When a particle diameter is greater than 100 nm, transparency of the nanoparticle-containing resin may be reduced. A more preferable particle diameter is 1 to 50 nm, and a further preferable particle diameter is 1 to 20 nm.

The ratio of the nanoparticles in the containing material is preferably 1 to 80% by weight. When the ratio is less than 1% by weight, it may become difficult to manifest properties as a metal oxide such as a high refractive index. When the ratio is more than 80% by weight, transparency of the nanoparticle-containing resin may be reduced.

The polymerizable vinyl monomer is not particularly limited as long as the nanoparticle-containing solution or the nanoparticle-containing dried body can be contained (can be dispersed) therein. For example, a (meth)acrylic acid-based monomer and a vinyl-based monomer can be used.

Examples of the (meth)acrylic acid-based monomer include acrylic acid, methyl acrylate, ethyl acrylate, n-butyl acrylate, isobutyl acrylate, dodecyl acrylate, stearyl acrylate, benzyl acrylate, 2-ethylhexyl acrylate, tetrahydrofurfuryl acrylate, (cyclo)hexyl acrylate, norbornyl acrylate, isobornyl acrylate, adamantyl acrylate, (iso)butoxymethyl acrylate, (iso)butoxyethyl acrylate, methoxybutyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, benzyl methacrylate, tetrahydrofurfuryl methacrylate, (cyclo)hexyl methacrylate, norbornyl methacrylate, isobornyl methacrylate, adamantyl methacrylate, (iso)butoxymethyl methacrylate, (iso)butoxyethyl methacrylate, methoxybutyl methacrylate, and the like.

Examples of the vinyl-based monomer include styrene-based monomers such as styrene, o-methylstyrene, m-methylstyrene, p-methylstyrene, α-methylstyrene, p-methoxystyrene, p-t-butylstyrene, p-phenylstyrene, o-chlorostyrene, m-chlorostyrene, and p-chlorostyrene; vinylnaphthalene; vinylbiphenyl; and the like.

The polymerizable vinyl monomer may comprise a crosslinking monomer. By using the crosslinking monomer, organic polymer microparticles having a crosslinking structure between molecules are obtained. Examples of the crosslinking monomer include (meth)acryl-based crosslinking monomers such as triacrylic acid trimethylolpropane, dimethacrylic acid ethylene glycol, dimethacrylic acid diethylene glycol, dimethacrylic acid triethylene glycol, dimethacrylic acid decaethylene glycol, dimethacrylic acid pentadeca ethylene glycol, dimethacrylic acid pentacontahecta ethylene glycol, dimethacrylic acid 1,3-butylene, allyl methacrylate, trimethacrylic acid trimethylolpropane, tetramethacrylic acid pentaerythritol, and dimethacrylic acid phthalic acid diethylene glycol; aromatic divinyl-based crosslinking monomers such as divinylbenzene, divinylnaphthalene, and divinylbiphenyl; and the like. An amount of the crosslinking monomer in all monomers is preferably 50% by weight or less.

Two or more of the above monomers may be used.

The polymerizable nanoparticle-containing material may comprise a polymerization initiator. Examples of the polymerization initiator include oil-soluble peroxide-based polymerization initiators or azo-based polymerization initiators or photopolymerization initiators. Specifically, examples thereof include peroxide-based polymerization initiators such as benzoyl peroxide, lauroyl peroxide, octanoyl peroxide, benzoyl orthochloroperoxide, benzoyl orthomethoxyperoxide, methyl ethyl ketone peroxide, diisopropyl peroxydicarbonate, cumene hydroperoxide, cyclohexanone peroxide, t-butyl hydroperoxide, and diisopropylbenzene hydroperoxide; azo-based initiators such as 2,2'-azobisisobutyronitrile, 2,2'-azobis(2,4-dimethylvaleronitrile), 2,2'-azobis(2,3-dimethylbutyronitrile),2,2'-azobis(2-methylbutyronitrile), 2,2'-azobis(2,3,3-trimethylbutyronitrile), 2,2'-azobis(2-isopropylbutyronitrile), 1,1-azobis(cyclohexane-1-carbonitrile), 2,2'-azobis(4-methoxy-2,4-dimethylvaleronitrile), (2-carbamoylazo)isobutyronitrile, 4,4'-asobis(4-cyanovaleric acid), dimethyl-2,2'-azobisisobutyrate, and 1,1'-azobis (1-acetoxy-1-phenylethane); and photopolymerization initiators such as 2-hydroxy-2-methyl-1-phenyl-propane-1-one, 1-hydroxy-cyclohexyl-phenyl-ketone, 1-[4-(2-hydroxyethoxy)-phenyl]-2-hydroxy-2-methyl-propane-1-one, 2-methyl-1-[(methylthio)phenyl]-2-morpholinopropane-1-one, and 2-benzyl-2-dimethylamino-1-(4-morpholinophenyl)-butane-1-one.

The polymerization initiator is used at preferably 0.01 to 15 parts by weight, and further preferably 0.1 to 7 parts by weight, based on a total of 100 parts by weight of the monomers. When the polymerization initiator is less than 0.01 part by weight, it is difficult to exert the function of polymerization initiation, and on the other hand, when the polymerization initiator is used at an amount exceeding 15 parts by weight, the cost may become uneconomical.

A method of causing the nanoparticle-containing solution or the nanoparticle-containing dried body to be contained (dispersed) in the polymerizable vinyl monomer is not particularly limited, and publicly-known methods can be used. Examples thereof include a media-type dispersing device such as a ball mill; an attritor, and a sand mill, a shear-type dispersing device such as a homomixer, a homogenizer, and a biomixer; an ultrasonic dispersing device; and the like.

(2) Nanoparticle-Containing Resin

A nanoparticle-containing resin can be obtained by polymerizing the polymerizable nanoparticle-containing material. Specifically, the nanoparticle-containing resin can be obtained by pouring the polymerizable nanoparticle-containing material into a glass container or a mold frame having the certain thickness, and closing the container or the mold frame, or polymerizing a monomer by heating or irradiating an active energy ray after coating on a substrate. The polymerization condition is not particularly limited, and can be appropriately set depending on a monomer species and a polymerization initiator species to be used.

The active energy ray refers to one having an energy quantum among an electromagnetic wave or a charged particle ray, that is, active light such as an ultraviolet ray or an electron beam. When crosslinked by irradiating an electron beam, a photopolymerization initiator is not required, but when crosslinked by irradiating active light such as an ultraviolet ray, it is preferable that a photopolymerization initiator exists. As the active energy ray used in the present invention, an ultraviolet ray is preferable. As an active energy ray source, a radiation source such as a high pressure mercury lamp, a halogen lamp, a xenon lamp, a metal halide lamp, an electron beam acceleration device, and a radioactive element is preferable.

The substrate which was used at the time of manufacturing of the nanoparticle-containing resin may be removed, or may be used as a supporting substrate for the nanoparticle-containing resin as it is.

(3) Nanoparticle-Containing Resin Particles

Nanoparticle-containing resin particles can be obtained by suspension polymerizing the polymerizable nanoparticle-containing material in an aqueous medium. Since the nanoparticles have a surface which was hydrophobized by a hydrophobic treatment agent, and have good affinity with the polymerizable vinyl monomer, a surface of the nanoparticles becomes to be covered with a resin derived from the polymerizable vinyl monomer, and accordingly, the resulting nanoparticle-containing resin particles can be easily incorporated at the time of incorporation into a film or a molded article, without necessity of a particular operation. The aqueous medium is not particularly limited, and examples thereof include water, a mixture of water and a lower alcohol (methanol, ethanol, and the like), and the like. The condition of suspension polymerization is not particularly limited, and can be appropriately set depending on a monomer species and a polymerization initiator species to be used.

In order to improve dispersibility of small droplets of the polymerizable nanoparticle-containing material, a suspension stabilizer may be contained in the aqueous medium. The suspension stabilizer is not particularly limited as long as it has conventionally been used in suspension polymerization of monomers. Examples thereof include water-soluble polymers such as polyvinyl alcohol, methylcellulose, polyacrylamide, and polyvinylpyrrolidone; hardly-soluble inorganic compounds such as calcium tertiary phosphate, magnesium pyrophosphate, magnesium oxide, and hydroxyapatite; and the like. When the hardly-soluble inorganic compound is used as the suspension stabilizer, it is preferable to concurrently use an anionic surfactant. Examples of the anionic surfactant include carboxylic acid salts such as fatty acid soap, N-acylamino acid or a salt thereof, and an alkyl ether carboxylic acid salt; sulfonic acid salts such as alkyl benzenesulfonic acid salt, alkyl naphthalene-sulfonic acid salt, dialkyl sulfosuccinic acid ester salt, alkyl sulfoacetic acid salt, and α-olefin sulfonic acid salt; sulfuric acid ester salts such as higher alcohol sulfuric acid ester salt, secondary higher alcohol sulfuric acid ester salt, alkyl ether sulfuric acid salt, and polyoxyethylene alkyl phenyl ether sulfuric acid salt; phosphoric acid ester salts such as alkyl ether phosphoric acid ester salt, and alkyl phosphoric acid ester salt; and the like.

Examples of a method of preparing (dispersing) the polymerizable nanoparticle-containing material include a method of directly adding a monomer composition into an aqueous medium, and dispersing it into an aqueous medium as monomer droplets with a stirring force of a propeller wing and the like; a method of dispersing a monomer composition using a homomixer which is a dispersing machine utilizing a high shear force constructed of a rotor and a stator, or an ultrasound dispersing machine; and the like.

Then, suspension polymerization is initiated by heating aqueous suspension in which the polymerizable nanoparticle-containing material is dispersed as spherical monomer droplets. During a polymerization reaction, it is preferable to stir aqueous suspension, and the stirring may be performed mildly to such an extent that floating of monomer droplets and settling of particles after polymerization can be prevented.

In suspension polymerization, a polymerization temperature is preferably around 30 to 100° C., and further preferably around 40 to 80° C. A time for holding this polymerization temperature is preferably around 0.1 to 20 hours.

The nanoparticle-containing resin particles have an average particle diameter of preferably around 0.1 to 1.00 µm, and further preferably around 1 to 50 µm. In this regard, an average particle diameter is appropriately selected depending on the thickness of a light diffusing layer of a light diffusing film in which the resin particles are used, the thickness of a substrate sheet, and the like. Accordingly, the diameter is not particularly limited to the aforementioned specific range, and the resin particles having an average particle diameter outside that range can also be used.

After polymerization, the particles are separated as a hydrous cake by a method such as suction filtration, centrifugal dehydration, centrifugal separation, and pressure dehydration, further, the resulting hydrous cake is washed with water and dried, thereby, objective nanoparticle-containing resin particles can be obtained. By preparation into resin particles containing the nanoparticles, the nanoparticles can be easily incorporated at incorporation into a coating material, a light diffusing film, or a molded article, without aggregation of the nanoparticles, without subjected to a specific process.

For the purpose of enhancing affinity with a resin which becomes a substrate constituting a coating material, a light diffusing film, or a molded article, the resin particles may be subjected to surface treatment. A method of surface treatment is not particularly limited, and a general surface treating method with an organic compound such as a surfactant and a higher fatty acid, or with various coupling agents, or the method described in Japanese Unexamined Patent Application, First Publication No. 2002-179806 may be used.

(Coating Material)

A coating material comprises nanoparticle-containing resin particles, a binder resin, and a solvent.

The binder resin is preferably a resin having high transparency. Examples of the transparent binder resin include a polycarbonate resin, a linear polyester, a (meth)acryl-based resin, a melamine-based resin, a silicone-based resin, a urethane-based resin, an epoxy-based resin, a styrene-based resin, a vinyl acetate-based resin, a (meth)acryl-styrene resin, a polyol-based resin, and the like.

To the binder resin may be conveniently added a curing agent (isocyanate-based or the like), a dispersant, a fluorescent dye, and the like.

The solvent is not particularly limited as long as it can contain (disperse) the nanoparticle-containing resin particles and the binder resin. Examples thereof include water; lower alcohols having 1 to 4 carbon atoms such as methanol, ethanol, propanol, and butanol; lower ketones such as methyl ethyl ketone, methyl isobutyl ketone, and acetone; aromatic hydrocarbons such as toluene, xylene, and cyclohexane; and the like.

The content ratio of the nanoparticle-containing resin particles in the coating material is not particularly limited, but is preferably 10 to 400% by volume, and further preferably 20 to 200% by volume, relative to the binder resin.

The solid content concentration in the coating material is not particularly limited, and can be appropriately selected depending on a coating system. An amount of the solvent in the coating material is preferably 10 to 80% by weight, and further preferably 20 to 70% by weight.

The coating material may comprise other components such as a coloring agent, a fluorescent dye, a curing agent (isocyanate-based or the like), and a dispersant.

(Light Diffusing Film)

A light diffusing film can be obtained by drying a coating material to form a light diffusing layer. Specifically, the light diffusing layer can be obtained by coating the coating material on a substrate, and thereafter, heating the resulting coated film to dry a solvent. The substrate is not particularly limited, and can be used by appropriately selecting from, for example, resin substrates such as polyethylene terephthalate, a polyester, an acrylic resin, a polycarbonate, and a polyamide, and inorganic substrates such as a transparent glass sheet. The thickness thereof is not particularly limited, but in view of ease of processing and handling property, around 10 to 500 µm is preferable.

Examples of the coating method include a reverse roll coating method, a gravure coating method, a die coating method, a knife coating method, a comma coating method, a spray coating method, and the like. The drying condition is not particularly limited, and can be appropriately set depending on a solvent species to be used.

The light diffusing layer is preferably around 1 to 100 µm, in a part in which the nanoparticle-containing resin particles do not exist. In the case of the thickness of less than 1 µm, it may become difficult to maintain the light diffusing film. When the thickness is more than 100 µm, the effect of improving a refractive index by containing the nanoparticle-containing resin particles may be reduced. The more preferable thickness is in the range of 1 to 20 µm, and the further preferable thickness is in the range of 1 to 10 µm.

Furthermore, it is preferable that an irregular structure is formed on a film plane having the light diffusing layer. The particles may be one, or may be in the state where plural particles are overlapped, and it is preferable that ¼ or more, preferably ½ or more of a particle surface forms a semispherical irregular structure caused by a protruded particle shape. A surface of the spherical particles forming an irregular structure may be or may not be covered with the resin, but the case where a surface is covered with a thin resin layer is preferable in respect of separation prevention of spherical particles and the surface strength. The film thickness of the resin layer covering the spherical particles is preferably less than 1 µm since a spherical particle-derived curved shape is formed.

The substrate which was used at the time of manufacturing the light diffusing film may be removed, or may be used as a supporting substrate for the light diffusing film as it is.

The light diffusing film can be used in an illumination cover, a light diffusing sheet of a transmission-type display (for example, liquid crystal display), a light extraction film for an organic EL display/illumination, an illumination signboard, and the like.

(Molded Article)

A molded article comprises the nanoparticle-containing resin particles and a transparent resin. As the transparent resin, a resin which transmits 50% or more of a desired wavelength can be used. Specifically, examples thereof include a polystyrene resin, a polymethyl methacrylate resin, a polycarbonate resin, a polyester resin, a polyacetal resin, a polysulfone resin, a polyether sulfone resin, a polyvinyl chloride resin, a polyvinylidene chloride resin, an epoxy resin, an unsaturated polyester resin, a polyurethane resin, a diallyl phthalate resin, a diethylene glycol bis(allyl carbonate) resin, an acetylcellulose resin, and the like. It is preferable that the nanoparticle-containing resin particles are used at 0.05 to 10% by volume, based on a total amount of the nanoparticle-containing resin particles and the transparent resin.

Examples of the specific molded article include pellets, lenses, prisms, panels, films, optical waveguides (film-like, fiber-like or the like), optical disks, and the like. These molded articles can be used as a component part of various display devices (liquid crystal display, plasma display, and the like), various projector devices (OHP, liquid crystal projector, and the like), optical fiber communication devices (optical waveguide, light amplifier, and the like), cameras, videos, and the like.

The molded articles can be molded by a method such as injection molding, extrusion molding, compression molding, and cast molding.

On the molded articles, for example, a protective layer for preventing mechanical damage of a molded article surface due to friction or abrasion, a light absorbing layer for absorbing light having a not desirable wavelength which becomes the cause for deterioration of an inorganic particle, a substrate or the like, a permeation shielding layer for suppressing or preventing permeation of moisture or a reactive small molecule such as an oxygen gas, an anti-glare layer, a reflection preventing layer, a low refractive index layer, a transparent electrically conductive layer or a gas barrier layer comprising an inorganic oxide coating layer, a gas barrier layer or a hard coating layer comprising an organic substance coating layer, and the like can be provided. Examples of a method of forming these layers include a vacuum deposition method, a CVD method, a sputtering method, a dip coating method, a spin coating method, and the like.

(Nanoparticle-Containing Polymer Gel)

A nanoparticle-containing polymer gel (simply, also referred to as gel) contains a solvent or a plasticizer containing the nanoparticle-containing solution or the nanoparticle-containing dried body in a crosslinked polymer matrix. It is presumed that, in the gel, the nanoparticles and/or the dried body is (are) contained at a nanoscale.

The gel can be widely used as biomaterials, medical materials, hygiene materials, or industrial materials. Particularly, the gel can be used as biomaterials or medical materials such as a contact lens and an artificial crystalline lens, spacers of displays or touch panels, or general household electric or industrial materials such as an organic EL illumination member.

The gel may be an organogel (gel not substantially containing water), or a hydrogel (gel containing water).

(i) Crosslinked Polymer Matrix

A crosslinked polymer matrix means a polymer which has become matrix-like by crosslinking. The polymer matrix plays a role of maintaining the gel shape, by holding other components constituting the gel. The crosslinked polymer used in the matrix is not particularly limited as long as it plays this role. Examples thereof include a polymer derived from an acryl-based monomer.

Examples of the acryl-based monomer include:
acrylic acid; methacrylic acid;
alkyl acrylates such as butyl (meth)acrylate, pentyl (meth)acrylate, (cyclo)hexyl (meth)acrylate, heptyl (meth)acrylate, octyl (meth)acrylate, nonyl (meth)acrylate, cyclohexyl (meth)acrylate, norbornyl (meth)acrylate, isobornyl (meth) acrylate, adamantyl (meth)acrylate, lauryl (meth)acrylate, stearyl (meth)acrylate, and benzyl (meth)acrylate; hydroxylalkyl acrylates such as propanediol methacrylate, butanediol methacrylate, heptanediol (meth)acrylate, octanediol (meth)acrylate, nonanediol (meth)acrylate, and hydroxyethyl (meth)acrylamide;

alkylacrylamides such as dimethyl(meth)acrylamide, diethyl (meth)acrylamide, propyl(meth)acrylamide, butyl(meth) acrylamide, hexyl(meth)acrylamide, and octyl (meth)acrylamide;

alkoxyalkyl (meth)acrylates such as methoxymethyl (meth) acrylate, ethoxyethyl (meth)acrylate, propoxyethyl (meth) acrylate, butoxymethyl (meth)acrylate, butoxyethyl (meth) acrylate, methoxybutyl acrylate, and phenoxyethyl (meth) acrylate; alkoxy alkylacrylamides such as methoxybutyl (meth)acrylamide, ethoxymethyl (meth)acrylamide, propoxymethyl(meth)acrylamide, butoxymethyl(meth)acrylamide, pentyloxymethyl(meth)acrylamide, hexyloxymethyl(meth)acrylamide, heptyloxymethyl(meth)acrylamide, octyloxymethyl(meth)acrylamide, ethoxyethyl(meth)acrylamide, propoxyethyl(meth)acrylamide, and butoxyethyl (meth)acrylamide;

(meth)acrylates of dihydroxycycloalkane derivatives such as cyclopentanediol (meth)acrylate, adamantanediol (meth) acrylate, cyclopentanedimethanol (meth)acrylate, cyclopentanediethanol (meth)acrylate, cyclohexanediol (meth)acrylate, cyclohexanedimethanol (meth)acrylate, and cyclohexanediethanol (meth)acrylate; aminoalkyl (meth) acrylates such as N, N-dimethylaminoethyl (meth)acrylate, and N, N-dimethylaminopropyl(meth)acrylate;

sulfo (meth)acrylates such as sulfoethyl (meth)acrylate, sulfopropyl (meth)acrylate, and sulfobutyl (meth)acrylate;

crosslinking monomers such as ethylene glycol di(meth) acrylate, propanediol di(meth)acrylate, butanediol di(meth) acrylate, pentanediol di(meth)acrylate, hexanediol di(meth) acrylate, heptanediol di(meth)acrylate, octanediol di(meth) acrylate, nonanediol di(meth)acrylate, 2-ethylhexyl diethylene glycol (meth)acrylate, polyethylene glycol di(meth)acrylate, polypropylene glycol di(meth)acrylate, trimethylolpropane tri(meth)acrylate, and glycerin tri(meth) acrylate;

(meth)acryloylmorpholine; (meth)acryloylpiperidine; (meth)acryloylpyrrolidine; and the like. The alkyl group and the alkoxy group having 3 or more carbon atoms include allowable structural isomers (for example, normal, iso, tert, and the like).

Examples of the monomer other than the acryl-based monomer include itaconic acid, maleic acid, allylcarboxylic acid, styrenesulfonic acid, vinylsulfonic acid, N-vinylpyrrolidone, and the like.

The monomers may be used alone, or may be used by combining two or more kinds.

(ii) Ratio of Crosslinked Polymer Matrix and Nanoparticle-Containing Solution or Nanoparticle-Containing Dried Body The nanoparticle-containing solution or the nanoparticle-containing dried body is contained as the nanoparticle preferable in the range of 10 to 80 parts by weight, and more preferable in the range of 20 to 70 parts by weight, based on 100 parts by weight of the crosslinked polymer matrix.

(iii) Other Components

A plasticizer is generally contained in the gel.

As the plasticizer, usually, a polyhydric alcohol is used. The polyhydric alcohol is not particularly limited, and publicly-known polyhydric alcohols can be used alone or by combining them. Examples of the polyhydric alcohol include propylene glycol, butanediol, pentanediol, hexanediol, polypropylene glycol, polybutanediol, polyoxyethylene glyceryl ether, polyoxyethylene diglyceryl ether, polyoxyethylene polyoxypropylene glyceryl ether, polyoxyethylene polyoxypropylene diglyceryl ether, polyoxypropylene glyceryl ether, polyoxypropylene diglyceryl ether, and the like. Examples of a commercially available product of the polyhydric alcohol include PPG 1000, 2000 manufactured by Wako Pure Chemical Industries, Ltd., and SCP-400, 1000, 1200, 1600 manufactured by Sakamoto Yakuhin Kogyo Co., Ltd.

In addition to the above-described materials, ethylene glycol, glycerin, propylene glycol, butanediol, pentanediol, hexanediol, polypropylene glycol, polybutanediol, polyglyceryl, and the like may be contained as the plasticizer.

The content of the plasticizer is preferably 40 parts by weight to 200 parts by weight, more preferably 50 to 150 parts by weight, further preferably 60 to 150 parts by weight, and particularly preferably 65 to 130 parts by weight, based on 100 parts by weight of the crosslinked polymer matrix.

If necessary, water, organic solvents, electrolytes, antiseptic, bactericides, anti-mold agents, rust preventive agents, antioxidants, stabilizers, pH adjusting agents, perfumes, surfactants, coloring agents, and the like may be added to the gel.

(iv) Shape of Gel

Since the gel is usually obtained by polymerizing a liquid monomer blend solution, it can be appropriately molded depending on utility. For example, when used as an adhesive tape, it is desirable that the gel has been molded into a sheet having the thickness of 0.01 to 2.0 mm.

It is preferable that separators for protecting surfaces are provided on both sides of the gel. One of the separators may be a support. The support is not limited to a film for reinforcing the gel and retaining a form of the tape, and may be a light diffusing film or a functional film which has been coated with ITO, a silver nanomesh or the like. Usually, the gel is coated on the support, and is used as a so-called adhesive tape.

A material of the separator is not particularly limited, as long as it is a resin or a paper which can be molded into a film. Among them, resin films comprising a polyester, a polyolefin, a polystyrene, and the like; papers; papers obtained by laminating resin films; and the like are suitably used. Particularly, when used as a base film, biaxially stretched PET films, and papers obtained by laminating OPPs or polyolefins are preferable.

It is preferable that a surface to be contacted with the gel of the separator has been release-treated. If necessary, both sides of the separator may be release-treated. When both sides are release-treated, the peeling strengths of a front side and a back side may have a difference. Examples of a method of release-treatment include silicone coating. Particularly, baking-type silicone coating in which crosslinking and curing reactions are performed with heat or an ultraviolet ray is preferable.

Among the separators, in a top film which is arranged on a surface opposite to the base film, an optimal material is selected depending on a product form of the gel. For example, when the gel is handled as a thin rectangle, the material is not particularly limited as long as it is a resin or a paper which can be molded into a film as described above, but it is preferable that the gel has been release-treated like the base film.

When the gel is wound into a roll, stored, and distributed, the top film is desirably soft. The film having softness may be used on an inner circumferential side and/or on an outer circumferential side of a wound roll, but it is more preferable to arrange the film on an outer circumferential side. Specifically, when a gel sheet of a three-layer structure of the base film, the gel, and the top film is wound into a roll, if the top film on at least one side (positioned on an outer circumferential side of a roll) is extended, winding crease can be reduced. Use of the film having no softness on both sides is not preferable since a risk of generating winding crease is enhanced.

(v) Process for Manufacturing Gel

A gel is obtained by, for example, (1) preparing a monomer blend solution comprising an acryl-based monomer and, optionally, other additives, and (2) molding it into an arbitrary shape at the same time with a polymerization reaction.

(1) Preparation of Monomer Blend Solution

Optionally, other additives are mixed and stirred into an acryl-based monomer to dissolve.

(2) Polymerization Reaction and Molding

The resulting monomer blend solution is injected into a mold frame having an arbitrary shape, and then, polymerized, thereby, a gel is obtained. Alternatively, the monomer blend solution is poured into between two resin films (base film, top film), and polymerized in the state where the solution is retained at the certain thickness and, thereby, a sheet-like gel is obtained. Furthermore, the monomer blend solution is thin layer-coated on one resin film (base film or support), and polymerized, thereby, a film-like (thinner than sheet-like) gel is obtained.

Examples of the polymerization method include in addition to the general radical polymerization, redox polymerization, photopolymerization, radiation polymerization, and the like. For example, when polymerized by injecting the monomer blend solution into a mold frame having a thickness or the depth of 10 mm or more, redox polymerization and general radical polymerization are preferable. Conversely, when molded into a sheet or a film having a thickness of several millimeters to several micrometers, photopolymerization is suitable. Polymerization by light irradiation is fast in a reaction rate, while in the case of a thick material, light is attenuated when transmitted, and there is a possibility that variation arises in a thickness direction. Polymerization by radiation is more excellent in transmittability than by light, but since a facility becomes a large scale, this is suitable in the case of a large production scale.

When two resin films are arranged on both sides of a gel, and the gel is generated by light irradiation, it is necessary that as a top film which is arranged on a light irradiation side, a material which does not shield light is selected. It is good not to use the film exemplified as the support as the top film. Particularly, when there is a possibility that the support is degraded by irradiation with an ultraviolet ray, since the support is arranged on a side on which an ultraviolet ray is immediately irradiated, this is not preferable.

The photopolymerization initiator is not particularly limited as long as it is cleaved with an ultraviolet ray or visible light to generate a radical. Examples thereof include α-hydroxyketone, α-aminoketone, benzyl methyl ketal, bisacylphosphine oxide, metallocene, and the like.

Specific examples of the photopolymerization initiator include 2-hydroxy-2-methyl-1-phenyl-propan-1-one (product name: Darocure 1173, manufactured by Ciba Specialty Chemicals), 1-hydroxy-cyclohexyl-phenyl-ketone (product name: Irgacure 184, manufactured by Ciba Specialty Chemicals), 1-[4-(2-hydroxyethoxy)-phenyl]-2-hydroxy-2-methyl-propan-1-one (product name: Irgacure 2959, manufactured by Ciba Specialty Chemicals), 2-methyl-1-[(methylthio)phenyl]-2-morpholinopropane-1-one (product name: Irgacure 907, manufactured by Ciba Specialty Chemicals), 2-benzyl-2-dimethylamino-1-(4-morpholinophenyl)-butane-1-one (product name: Irgacure 369, manufactured by Ciba Specialty Chemicals), and the like. These may be used alone, or may be used by combining a plurality of them.

The concentration of the photopolymerization initiator is preferably 0.01% by weight or more relative to the monomer blend solution in order to sufficiently perform a polymerization reaction and reduce a remaining monomer. The concentration is preferably 1% by weight or less in order to prevent discoloration (yellowing) or odor due to the remaining initiator after the reaction.

(Others)

Respective components constituting each of the nanoparticle-containing solution, the nanoparticle-containing dried body, the polymerizable nanoparticle-containing material, the nanoparticle-containing resin, the nanoparticle-containing resin particles, the coating material, the light diffusing film, the molded article and the gel described in explanation of them may be contained in an arbitrary combination.

EXAMPLES

The present invention will be illustrated in more detail below based on Examples, but the present invention is not limited by these Examples. Various measuring methods in Examples will be described below.

(Solubility Parameter)

A solubility parameter (SP value) is calculated based on the following estimation method of Fedors.

SP value($\delta$)=$(E_v/v)^{1/2}$=$(\Sigma \Delta e_i / \Sigma \Delta v_i)^{1/2}$      Fedors' Equation $E_v$: Evaporation energy
v: Molar volume
$\Delta e_i$: Evaporation energy of atom or atomic group of each component
$\Delta v_i$: Molar volume of each atom or atomic group As the evaporation energy and the molar volume of each atom or atomic group used in calculation of the above equation, values shown in the following Table 1 described in R. F. Fedors, Polym. Eng. Sci., 14 [2], 147-154 (1974) are used.

TABLE 1

| Atom or atomic group species | Evaporation energy (cal/mol) | Molar volume (cm$^3$/mol) |
|---|---|---|
| =CH— | 1,030 | 13.5 |
| >C= | 1,030 | −5.5 |
| —CH$_3$ | 1,125 | 33.5 |
| —CH$_2$— | 1,180 | 16.1 |
| =CH$_2$ | 1,030 | 28.5 |
| —CH< | 820 | −1.0 |
| —COO | 4,300 | 18.0 |
| —COOH | 6,600 | 28.5 |
| Phenylene (o, m, p) | 7,630 | 52.4 |
| 5 or more-membered ring | 250 | 16.0 |

(Evaluation of Dispersibility in Monomer)

Using an ultrasonic cleaner (VS-150 manufactured by VELVO-CLEAR), the time until an aggregate becomes not to be confirmed is evaluated based on the following criteria.

○ . . . within 5 minutes
Δ . . . 5 minutes to 10 minutes
x . . . 10 minutes or longer (Particle Diameter of Nanoparticles)

A particle diameter mentioned herein means a Z-average particle diameter measured by utilizing a method called a dynamic light scattering method or a photon correlation method. Specifically, a polymerizable nanoparticle-containing material is adjusted to 10% by weight as a solid content, laser light is irradiated at 20° C., and intensity of scattered light scattered from nanoparticles of a metal oxide is measured by change in time in a microsecond unit. A numerical value calculated by the cumulant analysis method of a distribution of measured scattering intensity due to nanoparticles of a metal oxide becomes a Z-average particle diameter. The cumulant analysis method is a method of analysis by fitting to a normal distribution for calculating a Z-average particle diameter. A Z-average particle diameter by this method can be simply measured by a commercially available measuring apparatus, and in Examples, "Zetasizer Nano ZS" manufactured by Malvern Instruments Ltd. is used. Such a commercially available measuring apparatus is loaded with data analysis software, and measured date is automatically analyzed.

(Weight Decrease Rate of Nanoparticle-Containing Dried Body)

15 mg of a nanoparticle-containing dried body is precisely weighed, heated from 30° C. to 800° C. at a heating rate of 10° C./minute with a differential heat/heat quantity simultaneous measuring device Model TG/DTA 6200 (manufactured by SII NanoTechnology Inc.), and a degreased weight at the time of temperature rise of from 30° C. to 100° C. is defined as a moisture weight, and a degreased weight at the time of temperature rise of from 100° C. to 800° C. is defined as a hydrophobic treatment agent amount. A weight decrease rate is calculated by (moisture weight+hydrophobic treatment agent amount)÷15×100. A gas flow rate at heating is 230 ml air/minute.

(Observation of Cross Section of Nanoparticle-Containing Resin and Nanoparticle-Containing Resin Particles)

A section is excised from a sample, the section is embedded in an epoxy resin, and an ultrathin section (thickness 70 nm) is prepared using an ultramicrotome ("LEICA ULTRACUT UCT" manufactured by Leica Microsystems). Next, a photograph of the ultrathin section is taken with a transmission electron microscope ("H-7600" manufactured by Hitachi High-Technologies Corporation, camera system "ER-B" manufactured by AMT-Advanced Microelectronics Technology Incorporated). As a dyeing agent, ruthenium tetraoxide is used.

(Evaluation of Transparency of Nanoparticle-Containing Resin, Molded Article and Polymer Gel)

Using a haze meter (Model HM-150 manufactured by MURAKAMI COLOR RESEARCH LABORATORY CO., Ltd.), a total light transmittance is measured and is evaluated based on the following criteria:

○ . . . 80% or more
Δ . . . 50 to 80%
x . . . Less than 50%.

(Content of Zirconium Oxide)

The content of zirconium oxide is measured by performing measurement of the ash content after burning, under the following conditions:

Measuring device: Microwave-type muffle furnace Phoenx (manufactured by CEM) and a high precision analysis even electron balance HA-202M (manufactured by A&D Company, Limited)

Measuring conditions: Dwell time 1.5 hours, operation temperature 550° C., sample weight 0.5 to 1.0 g.

The measuring method is as follows.

A resin containing zirconium oxide is collected as a measurement sample, and a weight (weight of measuring sample before ashing) W1 of the measurement sample is measured. Then, the measurement sample is added into a magnetic crucible having a volume of 30 ml, heated at 550° C. for 1.5 hours, and the measurement sample is calcified, allowed to stand in a desiccator, and cooled. Then, a weight W2 of the measurement sample after ashing (after ashing measurement sample) in the magnetic crucible is measured, the resulting W1 and W2 are substituted into the following equation, and an amount of zirconium oxide in the nanoparticle-containing resin is calculated.

$$\text{Content of zirconium oxide(\% by weight)} = 100 \times W2/W1$$

(Average Particle Diameter of Resin Particles)

An average particle diameter of resin particles of 1 μm or more is calculated by filling an electrolyte solution in a pore having a pore diameter of 20 to 400 μm, and obtaining a volume from change in electrical conductivity of the electrolyte solution when particles pass through the electrolyte solution. An average particle diameter of the resin particles is a volume average particle diameter (arithmetic average diameter in particle size distribution based on volume) measured using a Coulter type precision particle size distribution measuring apparatus "Multisizer III" (manufactured by Beckmann Coulter, Inc.). Upon measurement, according to "REFERENCE MANUAL FOR THE COULTER MULTISIZER" (1987) published by Coulter Electronics Limited, and using apertures fitting to particle diameters of particles to be measured, calibration of Multisizer III is performed, and measurement is performed.

Specifically, 0.1 g of the resin particles are dispersed in 10 ml of a 0.1% by weight of nonionic surfactant solution using a touch mixer and an ultrasound to obtain a dispersion. To a beaker filled with an electrolyte solution for measurement "ISOTON (registered trademark) II" (manufactured by Beckmann Coulter, Inc.), attached to "Multisizer III" body is added the dispersion dropwise with a dropper while mildly stirring, and a reading of a densitometer of a "Multisizer III" body screen is adjusted at around 10%. Next, Aperture Size (diameter), Current (aperture current), Gain (gain), and Polarity (polarity of internal electrode) are inputted into the "Multisizer III" body according to "REFERENCE MANUAL FOR THE COULTER MULTISIZER" (1987) published by Coulter Electronics Limited, and a particle size distribution based on a volume is measured manually (manual mode). During measurement, the interior of the beaker is mildly stirred to such an extent that air bubbles do no enter, and at the time point at which a particle size distribution of 100,000 of particles is measured, measurement is terminated. A volume average particle diameter of the resin particles is an average value of particle diameters of measured 100,000 of particles, and means an arithmetic average diameter in a particle size distribution based on a volume.

An average particle diameter of resin particles of less than 1 μm means a Z-average particle diameter measured by utilizing a method called a dynamic light scattering method or a photon correlation method. Specifically, resin particles of less than 1 μm are adjusted at 10% by weight as a solid content, laser light is irradiated at 20° C., and intensity of scattered light scattered from resin particles is measured as change in the time in a microsecond unit. A numerical value calculated by the cumulant analysis method of a distribution of scattering intensity due to measured resin particles becomes a Z-average particle diameter. The cumulant analysis method is a method of analysis by fitting to a normal distribution for calculating a Z-average particle diameter. A Z-average particle diameter by this method can be simply measured with a commercially available measuring device, and in Examples, "Zetasizer Nano ZS" manufactured by Malvern Instruments Ltd. is used in measurement. Such a commercially available measuring device is loaded with data analysis software, and measured date is automatically analyzed.

(Measurement of Density of Resin Particles)

A true specific gravity is measured in accordance with the A method in JIS K5101-11-1, and the value is adopted as a density of the resin particles. Specifically, in a constant temperature chamber at 20° C., measurement is performed as follows. A Wadon-type pycnometer of a volume of 50 ml is filled with a 0.2% by weight of nonionic surfactant solution, and a weight at this time is referred to as A g. Next, the pycnometer is emptied by discarding an aqueous solution therein, then, about 3 g of the resin particles as a sample are transferred into the pycnometer, and a weight of the transferred resin particles is referred to as B g. An aqueous surfactant solution is added thereto to fill the pycnometer, a weight at that time is referred to as C g, and a density is calculated by the following equation.

$$\text{Density (g/ml)} = B \times 0.9982 / (A - C + B) \quad \text{[Equation]}$$

(Method of Measuring Refractive Index of Resin Particles)

Measurement of a refractive index of the resin particles is performed by the Becke method. In measurement of a refractive index by this Becke method, the resin particles are placed on a slide glass, a refraction liquid (manufactured by Shimadzu Device Corporation; a plurality of refraction liquids having a refractive index of 1.600 to 1.748 at intervals of a refractive index difference of 0.004 are prepared) is added dropwise. After the resin particles and the refraction liquid are mixed well, a contour of the particles is observed with an optical microscope from an upper part, while light of a high pressure sodium lamp (Model "NX35", central wavelength 589 nm) manufactured by Iwasaki Electric Co., Ltd. is irradiated from a lower part. When the contour is not seen, it is determined that a refractive index of the refraction liquid and that of the resin particles are equal.

Observation with an optical microscope is not particularly problematic as long as it is observation at magnification at which the contour of the resin particles can be confirmed, and in the case of particles having a particle diameter of 5 µm, observation at magnification of around 500 times is suitable. Since by the above operation, as a refractive index of the resin particles and that of the refraction liquid are closer, the contour of the resin particles becomes difficult to be seen, it is determined that a refractive index of the refraction liquid at which the contour of the resin particles is seen with most difficult is equal to a refractive index of the resin particles.

When there is no difference in seeing of the resin particles between two kinds of refractive liquids having a refractive index difference of 0.004, an intermediate value of refractive indices of these two kinds of refraction liquids is determined to be a refractive index of the relevant resin particles. For example, a test is performed in a refraction liquid having a refractive index of 1.712 and a retraction liquid having a refractive index of 1.716, respectively, in the case where there is no difference in seeing of the resin particles between both refraction liquids, an intermediate value 1.714 of refractive indices of these refraction liquids is determined to be a refractive index of the resin particles.

(Light Diffusibility)

Light diffusibility is evaluated by the following diffusivity.

Using an automatic goniophotometer GONIOPHOTOMETER Model GP-200 (manufactured by MURAKAMI COLOR RESEARCH LABORATORY CO., Ltd.), among transmitted light when light enters from a normal line direction, intensity (I5) of transmitted light at an angle of 5° relative to a normal line direction, intensity (I20) of transmitted light at an angle of 20° (L20) and intensity (I70) of transmitted light at an angle of 70° (L70) are measured, respectively, and the diffusivity D is obtained by equations (1) and (2).

$$B\theta = I\theta / \cos\theta \quad \text{Equation (1)}$$

($\theta$ is an angle relative to a normal line direction, I$\theta$ . . . intensity of transmitted light at an angle $\theta$, B$\theta$ . . . brightness in an angle $\theta$ direction)

$$D = (B20 + B70) \times 100 / (2 \times B5) \quad \text{Equation (2)}$$

As the diffusivity D is greater, it can be determined that diffusibility is better, and the diffusivity is preferably 15% or more, and further preferably 18% or more.

(Brightness)

A film attached to a front side of a commercially available panel for illumination (P06A0203N-A13A manufactured by Lumiotec Inc.) is peeled, and is used as a light source. A silicone adhesive layer is formed on back sides of light diffusing films manufactured in Examples and Comparative Examples as described later, and are stuck on the light source so that air bubbles do not enter, and measurement is performed. Measurement is performed using a brightness photometer (SR-3AR manufactured by TOPCON TECHNOHOUSE CORPORATION) fixed at a position 50 cm isolated above this light source.

Letting brightness measured in the state where a film is not stuck on the light source to be 100%, a relative value (%) of brightness on the light diffusing films manufactured in Examples and Comparative Examples is calculated, and this relative value is accessed as brightness improving property. Brightness improving property is preferably 110% or more, and further preferably 112% or more.

Example 1

(Nanoparticle-Containing Solution)

3 g of a methanol-containing material of nanoparticles of zirconium oxide (manufactured by SAKAI CHEMICAL INDUSTRY CO., LTD., trade name SZR-M, zirconia content 30% by weight, particle diameter: 3 nm), 81 mg of polyoxyalkylene alkyl ether phosphoric acid ester (manufactured by DKS Co., Ltd., trade name Plysurf A208F, $R_1$=octyl, $R_2$=H, n=1 to 30, a and b=1 and 2 or 2 and 1, HLB=9) as a phosphoric acid ester, and 189 mg of 2-methacryloyloxyethyl succinate (manufactured by KYOEISHA CHEMICAL Co., LTD., trade name Light Ester HOMS, $R_3$=$CH_3$, Z=$COOC_2H_4O$—C(=O)—$C_2H_4$, SP value=11.16) as a reactive group-containing carboxylic acid were weighed (ratio of a phosphoric acid ester and a reactive group-containing carboxylic acid: 30% by weight and 70% by weight). Weighed materials were stirred under room temperature for 2 hours to thereby obtain a nanoparticle-containing solution.

(Nanoparticle-Containing Dried Body)

Next, the nanoparticle-containing solution was transferred to a centrifugal settling tube, 0.75 g of deionized water was added thereto, and centrifugal separation was performed at 18,000 rpm for 10 minutes using a centrifugal separator (manufactured by Hitachi, Ltd., trade name himac CR22 GII Rotor RR24A-210). After 10 minutes, the supernatant was removed, and the sediment was dried with a vacuum dryer at 60° C. for 4 hours to thereby obtain a nanoparticle-containing dried body.

(Polymerizable Nanoparticle-Containing Material and Nanoparticle-Containing Resin)

Next, in a glass bottle (SV-50A manufactured by NICHIDEN RIKA GLASS CO., LTD.) having a volume of 50 ml, 0.9 g of the nanoparticle-containing dried body was dispersed in 1.95 g of styrene using an ultrasonic cleaner. Subsequently, 0.15 g of divinylbenzene as a crosslinking agent and 0.03 g of lauroyl peroxide as a polymerization initiator were added, and dispersed again in an ultrasonic cleaner to thereby obtain a polymerizable nanoparticle-containing material having a particle diameter of 7.6 nm. Then, after the glass bottle was purged with nitrogen, polymerization was performed by heating at 70° C. for 10 hours, to thereby obtain a nanoparticle-containing resin (3 mm thick) exhibiting light transmittance. Appearance of this resin was transparent, and a total light transmittance thereof was 82.3%. An electron microscope photograph of a cross section is shown in FIG. 1. From FIG. 1, it is seen that nanoparticles are substantially uniformly dispersed.

Example 2

In the same manner as in Example 1 except that a total of the nanoparticle-containing dried body, styrene and divinylbenzene was 100% by weight, the nanoparticle-containing dried body was used at 70% by weight (30% by weight in Example 1), styrene was 1.25 g, and divinylbenzene was 0.25 g, a polymerizable nanoparticle-containing material and a nanoparticle-containing rosin (3 mm thick) were obtained. Appearance of this resin was transparent, and a total light transmittance thereof was 80.4%.

Example 3

In the same manner as in Example 1 except that the phosphoric acid ester was 50% by weight (135 mg), and the reactive group-containing carboxylic acid was 50% by weight (135 mg), a nanoparticle-containing dried body, a polymerizable nanoparticle-containing material, and a nanoparticle-containing resin (3 mm thick) were obtained. Appearance of this resin was transparent, and a total light transmittance thereof was 81.7%.

Example 4

In the same manner as in Example 1 except that the phosphoric acid ester was 70% by weight (189 mg), and the reactive group-containing carboxylic acid was 30% by weight (81 mg), a nanoparticle-containing dried body, a polymerizable nanoparticle-containing material, and a nanoparticle-containing resin (3 mm thick) were obtained. Appearance of this resin was transparent, and a total light transmittance thereof was 80.6%.

Example 5

In the same manner as in Example 1 except that polyoxypropylene allyl ether phosphoric acid ester (manufactured by ADEKA CORPORATION, trade name Adekalia Soap PP-70, $R_1$=allyl group, $R_2$=$CH_3$, n=1 to 30, a and b=1 and 2 or 2 and 1, HLB=6) was used as the phosphoric acid ester, 2-methacryloyloxyethylhexahydrophthalic acid (manufactured by KYOEISHA CHEMICAL Co., LTD., trade name Light Ester HO—HH, $R_3$=$CH_3$, Z=$COOC_2H_4O$—C(=O)—$C_6H_{10}$, SP value=10.87) was used as the reactive group-containing carboxylic acid, the phosphoric acid ester was 10% by weight (27 mg), and the reactive group-containing carboxylic acid was 90% by weight (243 mg), a nanoparticle-containing dried body, a polymerizable nanoparticle-containing material, and a nanoparticle-containing resin (3 mm thick) were obtained. Appearance of this resin was transparent, and a total light transmittance thereof was 82.1%.

Example 6

In the same manner as in Example 1 except that polyoxypropylene allyl ether phosphoric acid ester (manufactured by ADEKA CORPORATION, trade name PP-70) was used as the phosphoric acid ester, 2-methacryloyloxyethylhexahydrophthalic acid (manufactured by KYOEISHA CHEMICAL Co., LTD., trade name Light Ester HO—HH) was used as the reactive group-containing carboxylic acid, the phosphoric acid ester was 5% by weight (13.5 mg), and the reactive group-containing carboxylic acid was 95% by weight (256.5 mg), a nanoparticle-containing dried body, a polymerizable nanoparticle-containing material, and a nanoparticle-containing resin (3 mm thick) were obtained. Appearance of this resin was transparent, and a total light transmittance thereof was 81.3%.

Example 7

Other than exchanging the reactive group-containing carboxylic acid to p-vinylbenzoic acid (manufactured by Wako Pure Chemical Industries, Ltd., $R_3$=H, Z=$C_6H_4$, SP value=11.51), a nanoparticle-containing dried body, a polymerizable nanoparticle-containing material, and a nanoparticle-containing resin (3 mm thick) were obtained in the same manner as in Example 1. Appearance of this resin was transparent, and a total light transmittance thereof was 82.9%.

Example 8

Other than exchanging the reactive group-containing carboxylic acid to methacrylic acid (manufactured by Mitsubishi Rayon Co., Ltd., trade name Methacrylic Acid, SP value=10.73), a nanoparticle-containing dried body, a polymerizable nanoparticle-containing material, and a nanoparticle-containing resin (3 mm thick) were obtained in the same manner as in Example 1. Appearance of this resin was transparent, but exhibited slight milky white, and a total light transmittance of the resin was 79.5%.

Example 9

In a glass bottle having a volume of 50 ml, 2.5 g of the nanoparticle-containing dried body obtained in Example 1 was dispersed in 2.5 g of benzyl acrylate using an ultrasonic cleaner.

Subsequently, 0.15 g of 1-hydroxy-cyclohexyl-phenyl-ketone was added as a polymerization initiator, and the mixture was dispersed again in an ultrasonic cleaner to thereby obtain a polymerizable nanoparticle-containing material having a particle diameter of 7.4 nm.

Then, a PET film was spread on a glass substrate, a mold frame consisting of a silicone rubber sheet having the thickness of 1 mm was placed thereon, the polymerizable nanoparticle-containing material was added dropwise into this frame, and then, a PET film having the thickness of 100 μm was covered, and fixed together with the glass substrate with a clip. This was polymerized with an ultraviolet irradiating device (JU-C1500 manufactured by JATEC, metal halide lamp, conveyor speed 0.4 m/min, total irradiated energy amount 1.740 mJ/cm²), to thereby obtain a nanoparticle-containing resin (1 mm thick) exhibiting light transmittance. Appearance of this resin was transparent, and a total light transmittance thereof was 87.8%.

Comparative Example 1

Figure 2:
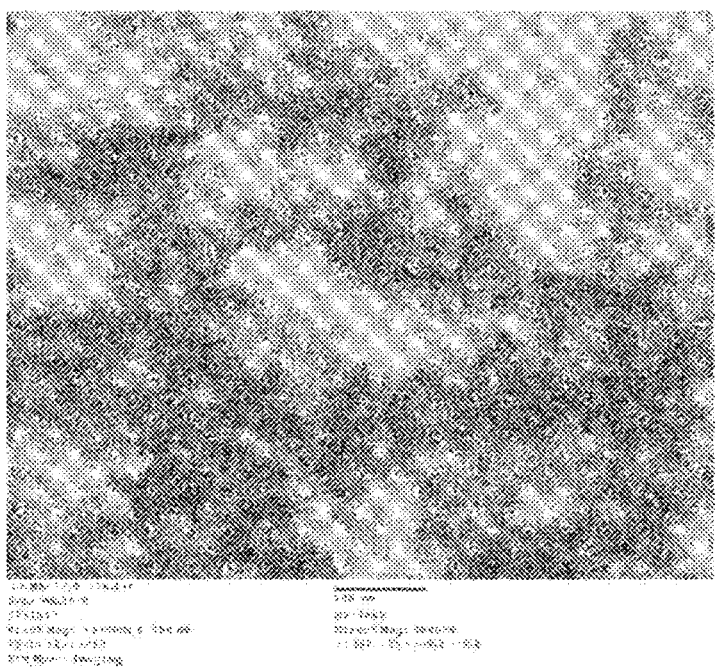
FIG. 2 is an electron microscope photograph of a cross section of a nanoparticle-containing resin of Comparative Example 1.

Other than using only the phosphoric acid ester at 100% by weight (270 mg), a nanoparticle-containing dried body, a polymerizable nanoparticle-containing material, and a nanoparticle-containing resin were obtained in the same manner as in Example 1, but they were aggregated during polymerization, and the resulting nanoparticle-containing resin was cloudy. An electron microscope photograph of a cross section of this resin is shown in FIG. 2. From FIG. 2, it is seen that nanoparticles are aggregated, and are not uniformly dispersed.

Comparative Example 2

Other than using only the reactive group-containing carboxylic acid at 100% by weight (270 mg), a nanoparticle-containing dried body was obtained in the same manner as in Example 1, but it was aggregated in the polymerizable vinyl monomer, and the resulting nanoparticle-containing resin was cloudy.

Comparative Example 3

Other than using only the reactive group-containing carboxylic acid (trade name HO—HH manufactured by KYOEISHA CHEMICAL Co., LTD, was used) at 100% by weight (270 mg), a nanoparticle-containing dried body was obtained in the same manner as in Example 1. Dispersion in the polymerizable vinyl monomer took 10 minutes or longer, but a polymerizable nanoparticle-containing material and a nanoparticle-containing resin (3 mm thick) were obtained. Slight reduction in transparency was observed in appearance of this resin, and a total light transmittance of this resin was 77.4%.

The results of Examples and Comparative Examples together with raw material species used and use amounts thereof are shown in Table 2.

From Table 2, it is seen that, by concurrently using the phosphoric acid ester and the reactive group-containing carboxylic acid having specified structures, dispersibility of nanoparticles of a metal oxide in a monomer is improved, and as a result, transparency of the resin containing nanoparticles is improved.

Example 10

Other than using γ-butyrolactone methacrylate (GBLMA, SP value=10.43) which is a reactive group-containing cyclic ester in place of the reactive group-containing carboxylic acid, a nanoparticle-containing solution was prepared in the same manner as in Example 1. Subsequently, the nanoparticle-containing solution was allowed to stand for 2 days under room temperature and atmospheric pressure to thereby obtain a nanoparticle dried body. In the same later steps as in Example 1, a polymerizable nanoparticle-containing material and a nanoparticle-containing resin (3 mm thick) were obtained. Appearance of this resin was transparent, and a total light transmittance thereof was 81.9%.

Example 11

In the same manner as in Example 10 except that a total of the nanoparticle-containing dried body, styrene and divinylbenzene was 100% by weight, the nanoparticle-containing dried body was used at 70% by weight (30% by weight in Example 10), styrene was 1.25 g. and divinylbenzene was 0.25 g, a polymerizable nanoparticle-containing material and a nanoparticle-containing resin (3 mm thick) were obtained. Appearance of this resin was transparent, and a total light transmittance thereof was 80.3%.

Example 12

In the same manner as in Example 10 except that the phosphoric acid ester was 50% by weight (135 mg), and the reactive group-containing cyclic ester was 50% by weight (135 mg), a nanoparticle-containing dried body, a polymerizable nanoparticle-containing material, and a nanoparticle-

TABLE 2

| | | Nanoparticle-containing solution | | Nanoparticle-containing dried body Weight decrease rate (%) | | Polymerizable nanoparticle-containing material | | | Transparency of nano-particle-containing resin | Zirconium oxide content |
|---|---|---|---|---|---|---|---|---|---|---|
| | | Phosphoric acid ester | Reactive group-contaning carboxylic acid | | | | Nanoparticle-containing dried body | Dispersibility in monomer | Particle diameter (nm) | | |
| | | species/amount (% by weight) | species/amount (% by weight) | 30 to 100° C. | 100 to 800° C. | Monomer | amount (% by weight) | | | | (% by weight) |
| Example | 1 | A208F/30 | HOMS/70 | 0.45 | 20.2 | Styrene | 30 | ○ | 7.6 | ○ | 24.5 |
| | 2 | A208F/30 | HOMS/70 | 0.45 | 20.2 | Styrene | 70 | ○ | 8.7 | ○ | 58.1 |
| | 3 | A208F/50 | HOMS/50 | 0.51 | 19.0 | Styrene | 30 | ○ | 7.7 | ○ | 24.3 |
| | 4 | A208F/70 | HOMS/30 | 0.56 | 19.3 | Styrene | 30 | ○ | 7.6 | ○ | 24.1 |
| | 5 | PP-70/10 | HO-HH/90 | 0.40 | 19.3 | Styrene | 30 | ○ | 8.1 | ○ | 24.9 |
| | 6 | PP-70/5 | HO-HH/95 | 0.43 | 19.5 | Styrene | 30 | ○ | 8.9 | ○ | 24.6 |
| | 7 | A208F/30 | BA/70 | 0.47 | 20.1 | Styrene | 30 | ○ | 7.7 | ○ | 24.4 |
| | 8 | A208F/30 | MA/70 | 0.53 | 20.9 | Styrene | 30 | ○ | 8.1 | △ | 24.2 |
| | 9 | A208F/30 | HOMS/70 | 0.45 | 20.2 | Benzyl acrylate | 50 | ○ | 7.4 | ○ | 40.8 |
| Comparative Example | 1 | A208F/100 | — | 0.59 | 20.5 | Styrene | 30 | ○ | 7.6 | x | 24.0 |
| | 2 | — | HOMS/100 | 0.44 | 18.7 | Styrene | 30 | x | — | x | 25.1 |
| | 3 | — | HO-HH/100 | 0.41 | 20.3 | Styrene | 30 | x | 10.2 | △ | 24.8 |

BA: Vinylbenzoic acid
MA: Methacrylic acid containing resin (3 mm thick) were obtained. Appearance of this resin was transparent, and a total light transmittance thereof was 81.2%.

Example 13

In the same manner as in Example 10 except that the phosphoric acid ester was 70% by weight (189 mg), and the reactive group-containing cyclic ester was 30% by weight (81 mg), a nanoparticle-containing dried body, a polymerizable nanoparticle-containing material, and a nanoparticle-containing resin (3 mm thick) were obtained. Appearance of this resin was transparent, and a total light transmittance thereof was 80.4%.

Example 14

In a glass bottle having a volume of 50 ml, 0.9 g of the nanoparticle-containing dried body obtained in Example 10 was dispersed in 1.95 g of methyl methacrylate using an ultrasonic cleaner. Subsequently, 0.15 g of ethylene glycol dimethacrylate as a crosslinking agent and 0.03 g of lauroyl peroxide as a polymerization initiator were added, and the mixture was dispersed again in the ultrasonic cleaner. In the same later steps as in Example 1, a nanoparticle-containing dried body, a polymerizable nanoparticle-containing material, and a nanoparticle-containing resin (3 mm thick) were obtained. Appearance of this resin was transparent, and a total light transmittance thereof was 83.7%.

Comparative Example 4

Other than using only the reactive group-containing cyclic ester at 100% by weight (270 mg), a nanoparticle-containing dried body was obtained in the same manner as in Example 10, but it was aggregated in the polymerizable vinyl monomer, and the resulting nanoparticle-containing resin was cloudy.

The results of Examples and Comparative Examples together with raw material species used and use amounts thereof are shown in Table 3. The results of Comparative Example 1 are also shown in Table 3.

nanoparticles of a metal oxide in a monomer is improved, and as a result, transparency of the resin containing nanoparticles is improved.

(Nanoparticle-Containing Resin Particles)

Example 15

Into a 2 L autoclave equipped with a stirrer and a thermometer, 900 g of deionized water and 27 g of polyvinyl alcohol (manufactured by Nippon Synthetic Chemical Industry Co., Ltd., trade name Gohsenol GL-05) were placed, the mixture was heated and stirred at 90° C. for 30 minutes to obtain a polyvinyl alcohol aqueous solution, which was cooled, and taken out into a beaker, and used as an aqueous phase.

Figure 3:
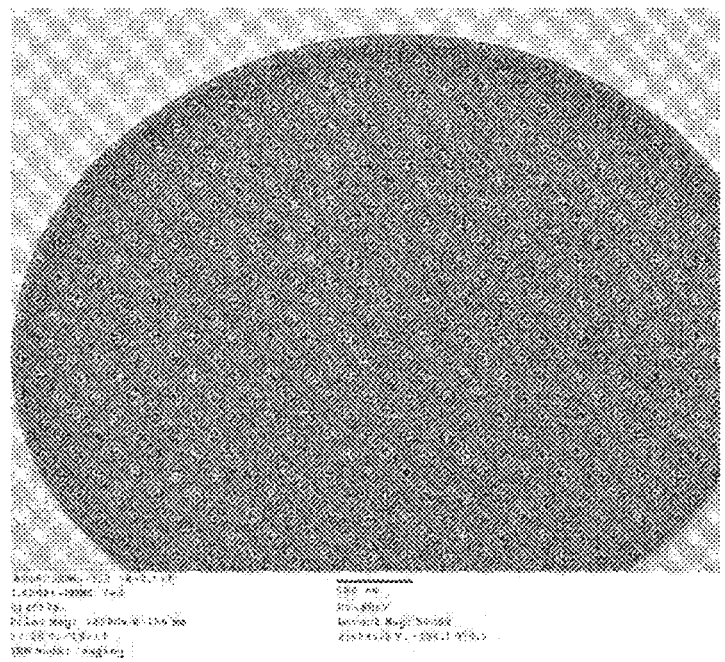
FIG. 3 is an electron microscope photograph of a cross section of nanoparticle-containing resin particles of Example 15.

100 g of the polymerizable nanoparticle-containing material obtained in Example 2 was added thereto, the mixture was stirred with T. K. homomixer (manufactured by PRI-MIX Corporation) at 8,000 rpm for 10 minutes, this solution was transferred into the autoclave, the autoclave was purged with nitrogen, and then, heated to 70° C., suspension polymerization was performed for 10 hours while stirring, and then, the reaction was cooled. The suspension obtained herein was filtered, washed, dried, and classified to thereby obtain nanoparticle-containing resin particles exhibiting light transmittance. An average particle diameter of the resulting resin particles was 6.3 μm, a density was 2.35 g/ml, a refractive index was 1.716, and a content of zirconium oxide was 67.8% by weight. An electron microscope photograph of a cross section of the resin particles is shown in FIG. 3. From FIG. 3, it is seen that nanoparticles are substantially uniformly dispersed.

Example 16

In 900 g of deionized water, 36 g of an anionic surfactant (manufactured by DKS Co., Ltd., Aqualon KH-1025, sterling part 25%) was dissolved, and this was used as an aqueous phase.

100 g of the polymerizable nanoparticle-containing material obtained in Example 2 was added thereto, the mixture was stirred with T. K. homomixer at 8,000 rpm for 10 minutes, divided into four, and dispersed with an ultrasound homogenizer (SONIFIER 450 manufactured by BRANSON, Duty Cycle 50%, Output Control 5) for 3 minutes, this liquid was transferred into an autoclave, the autoclave was purged with nitrogen, and the liquid was heated to 70° C., suspension-polymerized for 10 hours while stirring, and

TABLE 3

| | | Nanoparticle-containing solution | | Nanoparticle-containing dried body Weight reduction rate (%) | | Polymerizable nanoparticle-containing material | | | | Transparency of nanoparticle-containing resin | Zirconium oxide content |
|---|---|---|---|---|---|---|---|---|---|---|---|
| | | Phosphoric acid ester species/amount (% by weight) | Reactive group-containing cyclic ester species/amount (% by weight) | 30 to 100° C. | 100 to 800° C. | Monomer | Nanoparticle-containing dried body amount (% by weight) | Dispersibility in monomer | Particle diameter (nm) | | (% by weight) |
| Example | 10 | A208F/30 | GBLMA/70 | 0.71 | 26.6 | Styrene | 30 | ○ | 11.8 | ○ | 24.4 |
| | 11 | A208F/30 | GBLMA/70 | 0.71 | 26.6 | Styrene | 70 | ○ | 12.4 | ○ | 56.8 |
| | 12 | A208F/50 | GBLMA/50 | 0.64 | 24.0 | Styrene | 30 | ○ | 11.6 | ○ | 23.5 |
| | 13 | A208F/70 | GBLMA/30 | 0.67 | 22.8 | Styrene | 30 | ○ | 12.0 | ○ | 24.1 |
| | 14 | A208F/30 | GBLMA/70 | 0.71 | 26.6 | Methyl methacrylate | 30 | ○ | 27.9 | ○ | 27.9 |
| Comparative Example | 1 | A208F/100 | — | 0.59 | 20.5 | Styrene | 30 | ○ | 7.6 | x | 24.0 |
| | 4 | — | GBLMA/100 | 0.86 | 25.5 | Styrene | 30 | x | — | x | 23.8 |

Figure 4:
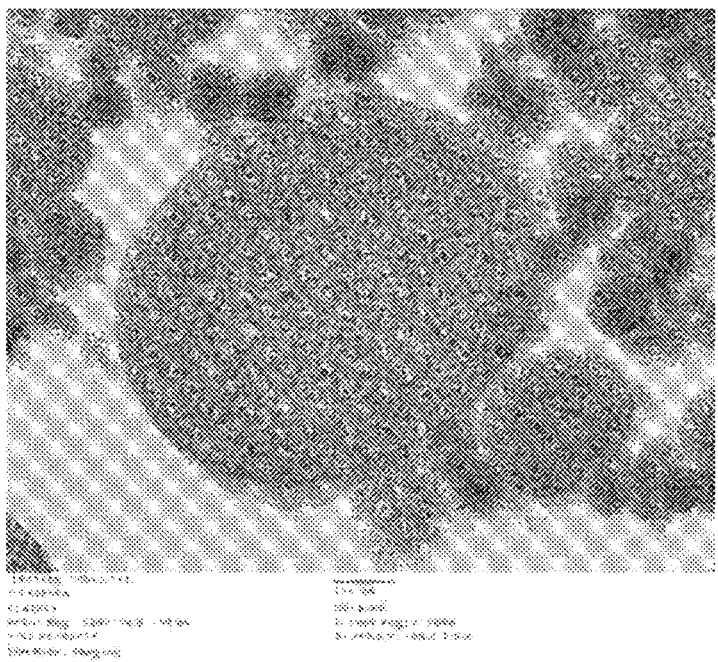
FIG. 4 is an electron microscope photograph of a cross section of nanoparticle-containing resin particles of Example 16.

From Table 3, it is seen that, by concurrently using the phosphoric acid ester and the reactive group-containing cyclic ester having specified structures, dispersibility of cooled. The suspension obtained herein was transferred onto a filter paper (quantitation filter paper manufactured by ADVANTEC, No. 5B), and the filtrate was dried to thereby obtain nanoparticle-containing resin particles exhibiting light transmittance. A Z-average particle diameter of the resulting resin particles was 199 nm, and a content of zirconium oxide was 65.1% by weight. An electron microscope photograph of the resin particles is shown in FIG. 4. From FIG. 4, it is seen that the nanoparticles are substantially uniformly dispersed.

Comparative Example 5

In the same manner as in Example 16 except that lauric acid was used in place of the phosphoric acid ester, and methacrylic acid was used as a methacryl group-containing carboxylic acid, a liquid droplet was deformed after homomixer stirring, and a stable spherical liquid droplet could not be formed.
(Coating Material)

Example 17

1 g of an acryl-based binder (manufactured by Dainichiseika Color & Chemicals Mfg. Co., Ltd., trade name: Mejiumu VM (K) (solid content 32%)), and 0.5 g of methyl ethyl ketone as a solvent were mixed. The resin particles obtained in Example 15 were added thereto so that an amount of the resin particles became 100% by volume relative to an amount of the binder, and the mixture was stirred for 3 minutes using a stirring defoamer. Then, 0.3 g of a curing agent (manufactured by Dainichiseika Color & Chemicals Mfg. Co., Ltd., trade name: Mejiumu VM (solid content 75%)) was added to the mixed liquid, and the mixture was stirred again with a stirring defoamer for 3 minutes to thereby obtain a coating material.

Comparative Example 6

Figure 5:
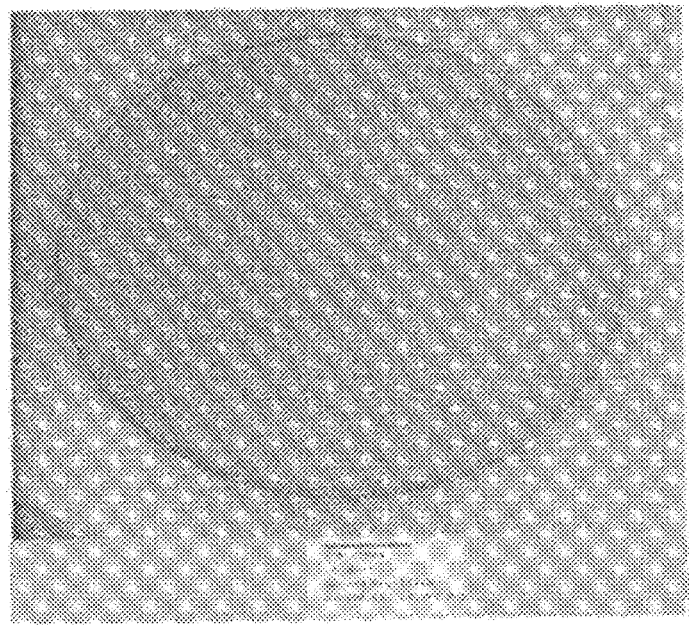
FIG. 5 is an electron microscope photograph of a cross section of crosslinked styrene microparticles not containing nanoparticles used in Comparative Example 6.

Other than exchanging the resin particles used in Example 17 to crosslinked styrene microparticles (average particle diameter 6.2 μm, density 1.06 g/ml) not containing the nanoparticles, a cross section photograph of which was shown in FIG. 5, a coating material was obtained in the same manner as in Example 17.
(Light Diffusing Film)

Example 18

The coating material obtained in Example 17 was added dropwise on a PET film, coating was performed using a doctor blade having the coating thickness of 50 μm, and this was dried for 10 minutes in a constant temperature fan dryer set at 70° C., to thereby obtain a light diffusing film. Diffusivity of the resulting film was 20.2%, and brightness improving property was 120%.

Comparative Example 7

Other than exchanging the coating material used in Example 17 to the coating material of Comparative Example 8, a light diffusing film was obtained in the same manner as in Example 18. Diffusivity of the resulting film was 17.4%, and brightness improving property was 108%.
(Molded Article: Molded Plate)

Example 19

The resin particles obtained in Example 15 were added at 0.2% by volume relative to the polystyrene resin, followed by mixing. The resulting mixture was molded with an injection molding machine at 240° C. to thereby obtain a molded plate having the thickness of 2 mm. Diffusivity of the resulting molded plate was 24.3%, and a total light transmittance thereof was 93%.

Comparative Example 8

Other than using the resin particles used in Example 15 to 0.5% by volume of crosslinked methyl methacrylate microparticles (average particle diameter 5.8 μm, density 1.18 g/ml), a molded plate was obtained in the same manner as in Example 19. Diffusivity of the resulting molded plate was 16.6%, and a total light transmittance thereof was 93%.
(Polymer Gel)

Example 20

The nanoparticle-containing dried body (3.0 g) obtained in Example 1 was dispersed in 1.2 g of toluene using ultrasonic waves. Subsequently, 3.0 g of isobutoxymethylacrylamide, 3.97 g of polyoxypropylene polyglyceryl ether (manufactured by Sakamoto Yakuhin Kogyo Co., Ltd., trade name SCP-1600) as a plasticizer, 0.02 g of 1,9-nonanediol diacrylate as a crosslinking agent, and 0.01 g of 1-[4-(2-hydroxyethoxy)-phenyl]-2-hydroxy-2-methyl-1-propane-Lone (trade name Irgacure 2959) as a photopolymerization initiator were added, and the mixture was dispersed using ultrasonic waves. Then, a PET film was spread on a glass substrate, a mold frame consisting of a silicone rubber sheet having the thickness of 1 mm was placed thereon, the resulting dispersion was added dropwise into this frame, and a PET film which had been similarly silicone-coated, and a glass substrate were placed thereon, and fixed with a clip. This was polymerized with an ultraviolet irradiating device (JU-C1500 manufactured by JATEC, metal halide lamp, conveyor speed 0.4 m/min, total irradiated energy amount 3,000mJ/cm$^2$), and dried with a vacuum oven at 60° C. for 16 hours to thereby obtain a nanoparticle-containing polymer matrix (polymer gel). Appearance of this polymer matrix was transparent, and a total light transmittance thereof was 85.1%.

What is claimed is:

1. Nanoparticle-containing resin particles comprising:
a resin, and
metal oxide nanoparticles dispersed within the resin,
the metal oxide nanoparticles being hydrophobized with a phosphoric acid ester and a reactive group-containing carbonyl compound, wherein:
the phosphoric acid ester is a compound represented by the following general formula (I):

where:
R$_1$ is an alkyl group having 8 to 13 carbon atoms or an allyl group,
R$_2$ is H or CH$_3$,
n is 1 to 30, and
the compound is a mixture in which a combination of a and b is a combination of 1 and 2 or 2 and 1; and
the reactive group-containing carbonyl compound is selected from:

a reactive group-containing carboxylic acid represented by the following general formula (II):

$$CH_2=CR_3-Z-COOH \qquad (II)$$

where:
R$_3$ is H or CH$_3$, and
Z is a divalent hydrocarbon group of 5 or more carbon atoms optionally containing an ester group; and a reactive group-containing cyclic ester represented by the following general formula (III):

$$CH_2=CR_3-X-M \qquad (III)$$

where:
R$_3$ is H or CH$_3$,
X is a divalent hydrocarbon group of 1 or more carbon atoms optionally containing an ester group, and
M is a lactone or a lactide.

2. A coating material, comprising the nanoparticle-containing resin particles according to claim 1, a binder resin, and a solvent.

3. A light diffusing film obtained by drying the coating material according to claim 2.

4. A molded article comprising the nanoparticle-containing resin particles according to claim 1 and a transparent resin.

5. The nanoparticle-containing resin particles of claim 1, wherein:
the reactive group-containing carbonyl compound has a solubility parameter calculated by Fedors' method of 10.0 to 12.5.

6. The nanoparticle-containing resin particles according to claim 1, wherein the reactive group-containing carbonyl compound is:
a reactive group-containing carboxylic acid represented by the following general formula (II)':

$$CH_2=CR_3COOC_2H_4O-C(=O)-O-C_xH_y-COOH \qquad (II)'$$

where:
R$_3$ is H or CH$_3$,
x=2 to 6, and
y=any of x−2, 2x, and 2x−2, or
the reactive group-containing cyclic ester.

7. The nanoparticle-containing resin particles according to claim 5, wherein the metal oxide is zirconium oxide.

8. The nanoparticle-containing resin particles according to claim 5, wherein the phosphoric acid ester and the reactive group-containing carbonyl compound are contained in the nanoparticle-containing resin particles at a weight % ratio of 5:95 to 70:30.

* * * * *